United States Patent [19]

Suzuki et al.

[11] Patent Number: 4,669,697
[45] Date of Patent: Jun. 2, 1987

[54] CHASSIS FOR ACCOMMODATING ELECTRONIC APPARATUS WITH DISPLAY MONITOR

[75] Inventors: Hiroshi Suzuki; Akimitsu Ohmori, both of Tokyo, Japan

[73] Assignee: Kabushiki Kaisha Toshiba, Kawasaki, Japan

[21] Appl. No.: 811,828

[22] Filed: Dec. 20, 1985

[30] Foreign Application Priority Data

Dec. 28, 1984 [JP] Japan .................................. 59-276224

[51] Int. Cl.⁴ .............................................. F16M 1/00
[52] U.S. Cl. .................................. 248/638; 220/4 R; 248/568
[58] Field of Search ............... 248/638, 637, 676, 678, 248/568; 211/26; 312/7.2; 220/4 R; 358/254

[56] References Cited

U.S. PATENT DOCUMENTS

| | | | |
|---|---|---|---|
| 3,907,050 | 9/1975 | Mullings | 220/4 R X |
| 4,002,831 | 1/1977 | Aeschliman | 312/7.2 X |
| 4,371,143 | 2/1983 | Ishida et al. | 248/638 |
| 4,563,560 | 1/1986 | Bonner | 220/4 R X |

FOREIGN PATENT DOCUMENTS

| | | | |
|---|---|---|---|
| 0017441 | 4/1967 | Japan | 220/4 R |
| 0136736 | 7/1952 | Sweden | 220/4 R |

*Primary Examiner*—Ramon O. Ramirez
*Attorney, Agent, or Firm*—Finnegan, Henderson, Farabow, Garrett & Dunner

[57] ABSTRACT

A quake-proof chassis for accommodating a display monitor comprises a main frame, a bottom reinforcement member, a cathode ray tube support frame and a rear panel member. A quake-proof chassis for accommodating power units and/or control units comprises left and right side panels having outwardly bent front end portions and inwardly bent upper and lower flanges, top and bottom panels having outwardly bent flanges provided along all the sides, and front and rear panels having inwardly bent upper and lower flanges. A quake-proof chassis for accommodating an electronic apparatus with a display monitor comprises a first chassis having the almost same structure as the chassis accommodating a display monitor described above and further having a base to provide inclination for the display monitor, at least one second chassis having the almost same structure as the chassis accommodating power units and/or control units described above, a first fastening member for fastening the first chassis to the second chassis, a third chassis for accommodating the first and the second chassis and a second fastening member for fastening the first fastening member to the third chassis.

20 Claims, 13 Drawing Figures

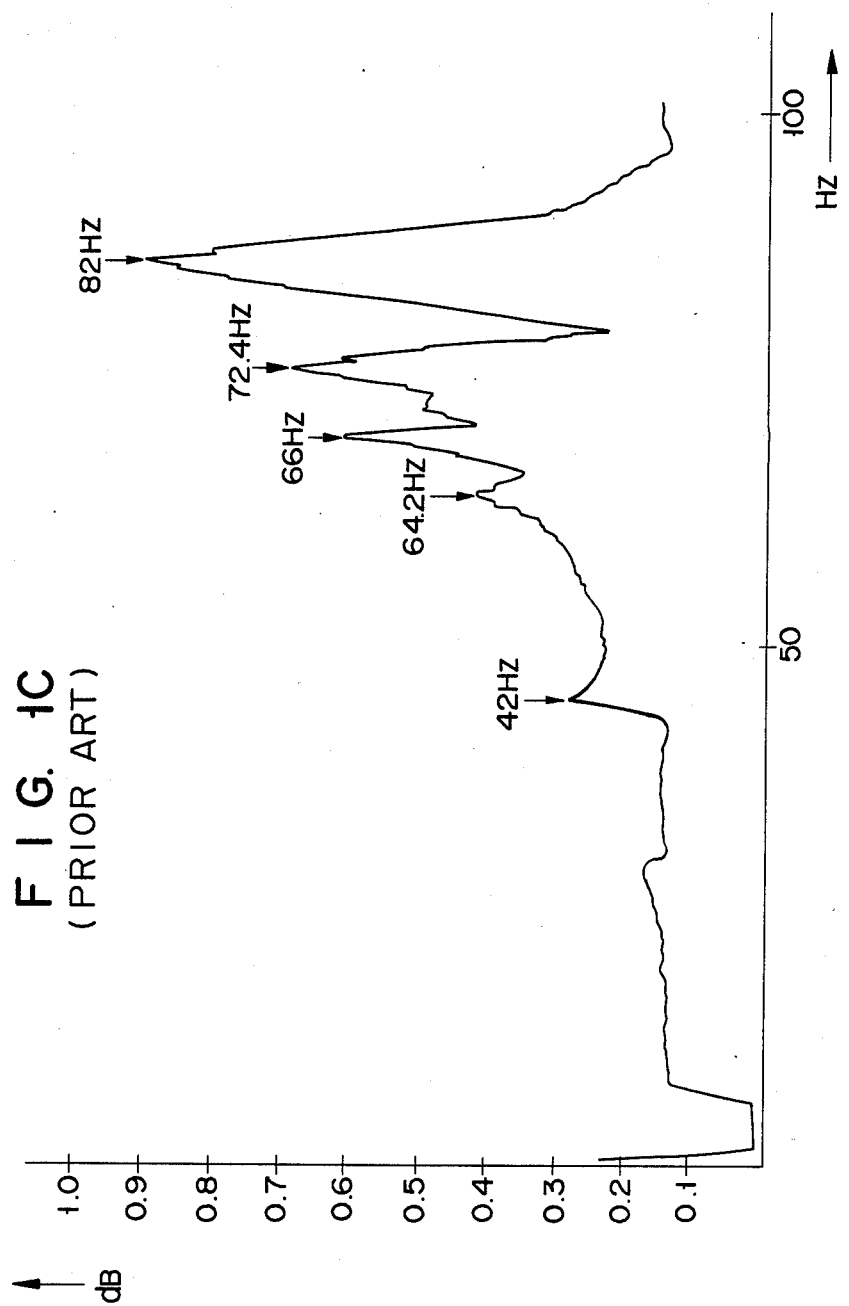

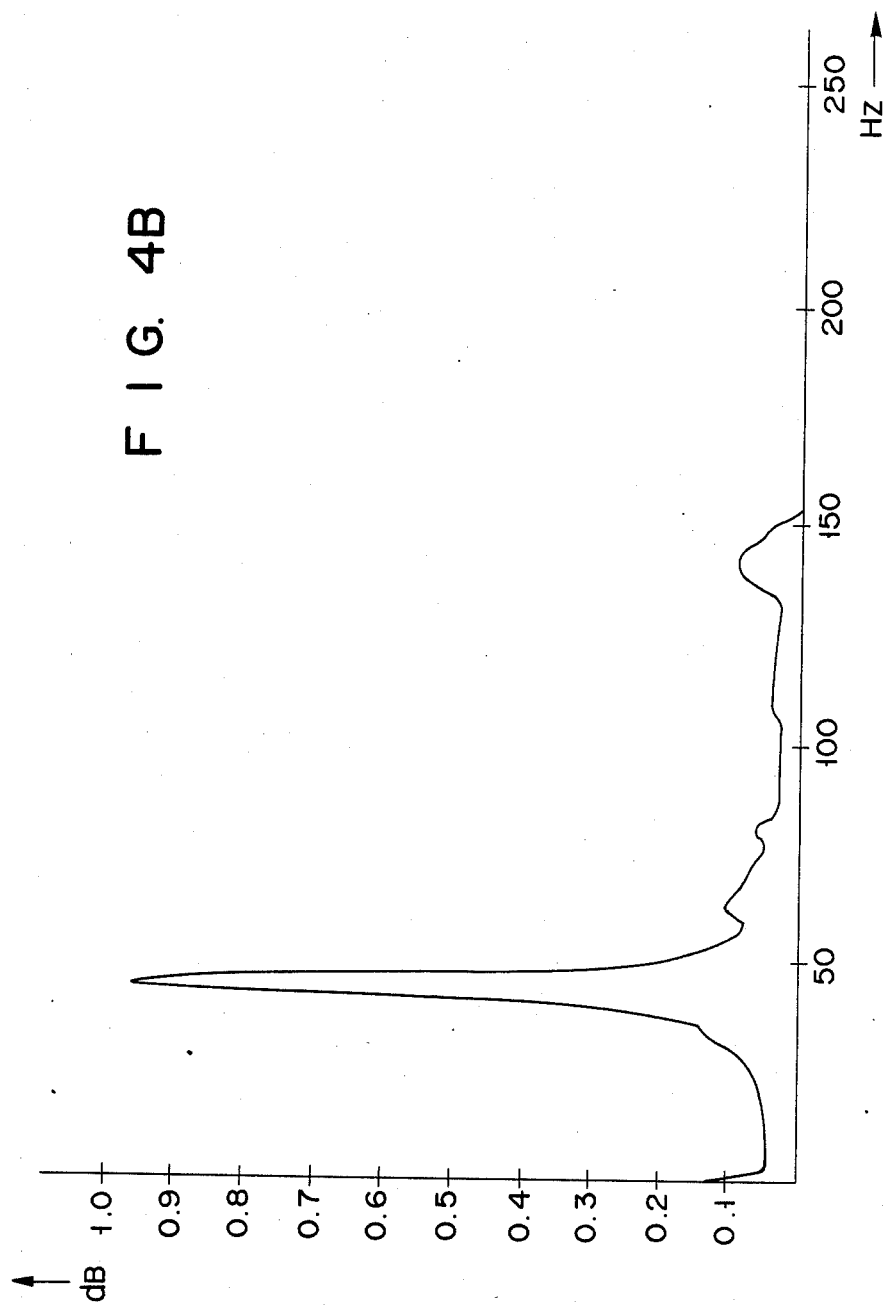

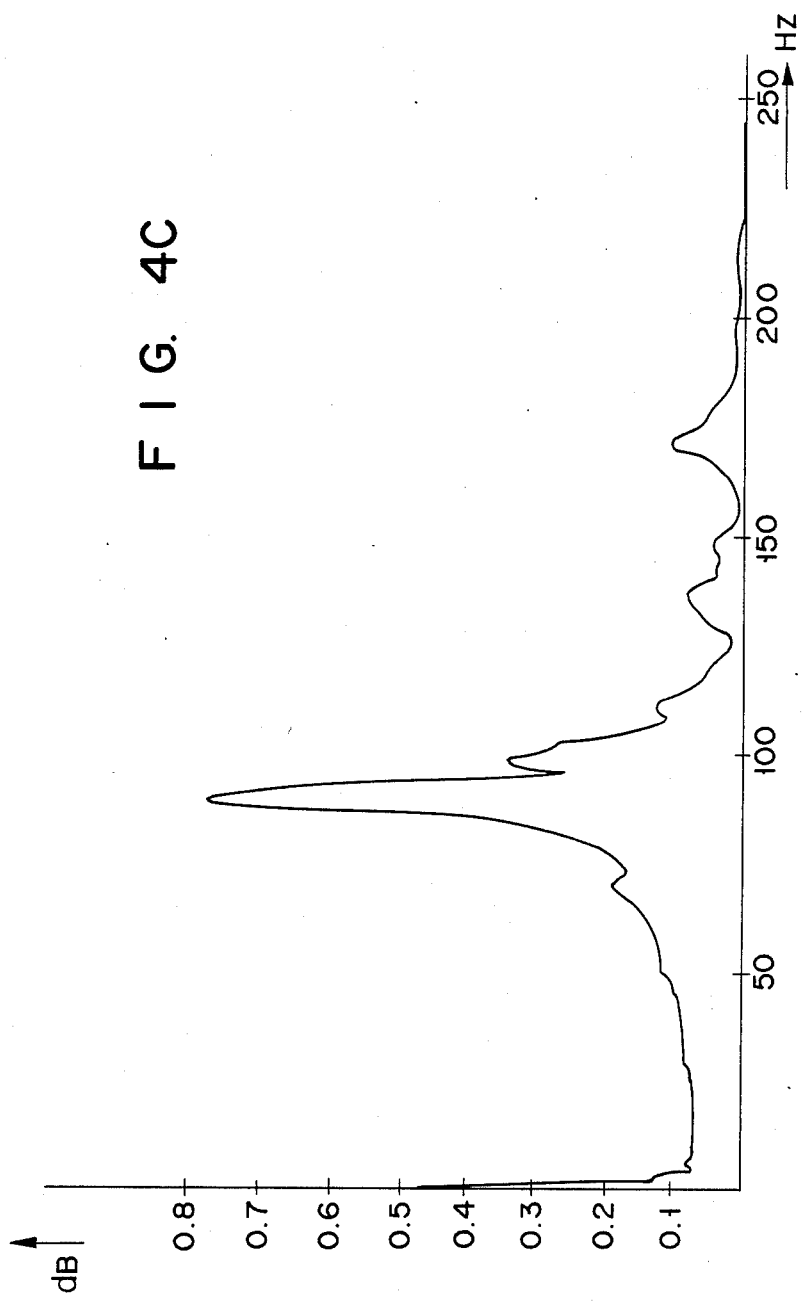
F I G. 4C

CHASSIS FOR ACCOMMODATING ELECTRONIC APPARATUS WITH DISPLAY MONITOR

BACKGROUND OF THE INVENTION

This invention relates to a chassis for accommodating an electronic apparatus with a display monitor used in computer systems or the like, and, more particularly, to the quake-proof structure of such a chassis.

Display monitor apparatuses such as CRT display monitor apparatuses (hereinafter referred to as CRT apparatuses) have become widely used, from home to office, because they display the image of an object. CRT apparatuses serve not merely as input/output terminals but are also used as monitors in computer systems and plant equipment, so that their importance is increasing. With the increase of the scope of application and the importance of CRT apparatuses, it has become more important to improve their adaptability to environments and also their reliability with respect to low frequency vibrations such as those engendered by an earthquake.

A CRT apparatus comprises a CRT and various other components. These components have respective frequencies of natural vibration which are determined by their shape, weight, etc. Problems arise when a vibration applied to the CRT apparatus has the same frequency as the natural vibration frequency of a component. In this case, the component resonates with the applied vibration, resulting in the generation of about 20-30 times the applied vibratory force.

Heretofore, vibration-proof members, e.g., vibration-proof rubber pieces, have been used to prevent the applied vibratory force from being amplified due to resonation of components with the applied vibration. With this vibration-proof member, it is necessary to make t/s smaller than the square root of 2 with respect to the transmission function, where s is the natural vibration frequency of the component (or the applied vibration frequency), and t is the vibration frequency of the vibration-proof member. Where this value is adopted, however, the vibration-proof member is very soft, and in the absence of vibration of the CRT apparatus is somewhat precariously unstable. For this reason, the value of t/s is actually set to form 2 to 4 in practice. With these values, however, sufficient effects can not be obtained with respect to low frequency vibrations such as an earthquake, although sufficient effects can be obtained with respect to high frequency vibrations of rotors or the like.

The frequency components of earthquake waves are centered in the range of from 0 to 30 Hz. In the prior art CRT apparatuses having components accommodated and mounted in a chassis, the frequency of natural vibration on the chassis is a round or below 30 Hz, as shown in the depth direction vibration response curve of FIG. 1A and in the width direction vibration response curve of FIG. 1B. These frequencies are or are nearly coincident with the main frequency components of earthquake waves. The main frequency of natural vibration of the CRT apparatus in the vertical direction is slightly higher as shown in FIG. 1C, thereby posing fewer problems. The prior art CRT apparatus chassis described above is equipped with no protective means against vibrations in the depth and width directions, such that, given its natural vibration frequencies are low, it resonates with low frequency vibrations such as those of an earthquake, consequently, adversely affecting the accommodated components. Thus, when low-frequency vibrations such as those of an earthquake are applied to the CRT apparatus, although the accommodated components may not resonate owing to the difference between their natural vibration frequencies and the main frequencies of an earthquake, the CRT apparatus may break or failure of its normal operation may result. Further, physical injury to the operators is a distinct possibility.

SUMMARY OF THE INVENTION

The invention has been devised in the light of the above. Its object is to provide a chassis for accommodating a display monitor, a chassis for accommodating power source units and/or control units and also a chassis for accommodating an electronic apparatus with a display monitor, which have increased frequencies of natural vibration and do not resonte with low-frequency vibrations such as those of an earthquake and can thus eliminate damage to the accommodated components.

To attain the above object of the invention, there is provided a quake-proof chassis for accommodating an electronic apparatus with a display monitor, which comprises:

a first chassis accommodating a display monitor, comprising:

a main frame having a front portion and a rear portion and a rectangular bottom plate having an inner and outer surface, two rectangular side panels each having an outer and inner surface and a predetermined length and being the same size and extending upwardly and vertically from the left and right sides of the first bottom plate, and two first rectangular top plate parts having the same size and extending inward and horizontally from the distal ends of the side panels;

a cathode-ray tube support frame having a second rectangular top plate part having a front and rear side and two rectangular side frames each having a front and rear side and a predetermined length and having the same size and extending downward and vertically from the left and right sides of the second top plate part, and a first reinforcement portion extending downward from the front sides of the second top plate part and inwardly from the side frames;

a rear panel member having a third rectangular top plate part having a front and rear side and a rectangular rear panel extending downward and vertically from the rear side of the third top plate part; and a bottom reinforcement member having the same length and width dimensions as the bottom plate of the main frame;

wherein, the side frames of the cathode-ray tube support frame and the rectangular rear panel have a vertical side length approximately equal to the length of the side panels of the main frame, and the length of the front side of the second top plate part and of the third top plate part are approximately equal to the length of the bottom plate of the main frame, and the cathode-ray tube support frame is secured at the front portion of the main frame such that outer surfaces of the side frames contact the inner surfaces of the side panels of the main frame, resulting in the second top plate part and the first bottom plate being approximately parallel, and the side panels, the bottom plate and the second top plate part forming at a front plane of the chassis a first opening to mount the display monitor therein, and the rear panel member is secured to the main frame at the rear portion thereof such that the left and right sides of the rear panel member contact the inner surfaces of the side panels of the main frame, resulting in the third top plate part and the bottom plate of the main frame being parallel, and the bottom reinforcement member is secured to the outer surface of the bottom plate of the main frame.

Preferably, the invention, as broadly disclosed herein, further includes at least one second chassis for accommodating power source units, comprising:

left and right side panels having rectangular side plates, a first reinforcement portion extending outward from the front end portions of the sides plates and serving as mounting portions for a separate chassis, second reinforcement portions extending inward from the rear sides of the side plates, and third upper and lower reinforcement portions extending inward from the upper and lower sides of the side plates;

a bottom panel having a second rectangular bottom plate and fourth reinforcement portions extending downward from the sides of the bottom plate, the bottom panel being configured such that the left and right lower sides of the fourth reinforcement portions are in contact with the inner surfaces of the lower portion of the third reinforcement portions and the opposite end portions of the outer surface of the rear portion of the fourth reinforcement portions contact the inner lower surfaces of the third reinforcement portions;

a top panel having a rectangular top plate and fifth reinforcement portions extending upward from the sides of the top plate, the top panel being configured such that the upper sides of the left and right portions of the fifth reinforcement portions are in contact with the inner surfaces of the upper portions of the third reinforcement portions and the opposite end portions of the outer surface of the rear portion of the fifth reinforcement portions are in contact with the inner upper surfaces of the second reinforcement portions;

a rear panel having a rectangular rear plate and sixth reinforcement portions extending inward from upper and lower sides of the rear plate, the sixth reinforcement portion having notches at the opposite end thereof, and the second rear panel being configured such that opposite left and right end portions of the rear plate contact the outer surfaces of the second reinforcement portions, and the upper side of the rear portion of the fifth reinforcement portions is in contact with the inner surface of the upper portion of the sixth reinforcement portions, and the lower side of the rear portion of the fourth reinforcement portions is in contact with the inner surface of the lower portion of the sixth reinforcement portions;

a front panel having a rectangular front plate and a seventh reinforcement portion with notches at the opposite ends thereof extending inward from the upper and lower sides of the front plate, the front panel being configured such that the upper side of the front portion of the fifth reinforcement portions and the lower side of the front portion of the fourth reinforcement portions contact the inner surface of the upper and lower portions of the eighth reinforcement portions, respectively, and the left and right ends of the front plate are in contact with the inner surfaces of the side panels.

It is further preferable that the invention include a first fastening means for fastening the first chassis to the second chassis, a third chassis for accommodating the first and second chassis, and a second fastening means for fastening the first fastening means to the third chassis.

According to the invention, the following effects can be obtained.

1. The display monitor chassis does not resonate with low frequency vibrations such as those of an earthquake and the conponents in the chassis are prevented from damage so that the natural frequency of vibration on the chassis gets high.

2. It is possible to adopt the quake-proof structure corresponding to the necessity of copying with an earthquake for each chassis in the CRT apparatus.

3. Coping with an earthquake on the basis of the quake-proof structure can be realized more simply and at lower cost than on the basis of vibration-proof members.

BRIEF DESCRIPTION OF THE DRAWINGS

FIGS. 1A to 1C are graphs showing the vibration response curves of depth direction, width direction and vertical direction on a prior art display monitor chassis, respectively;

FIGS. 4A to 4C are graphs showing vibration response curves in depth direction, width direction and vertical direction on the display monitor chassis shown in FIG. 2, respectively.

DETAILED DESCRIPTION OF THE PREFERRED EMBODIMENTS

Figure 1A:
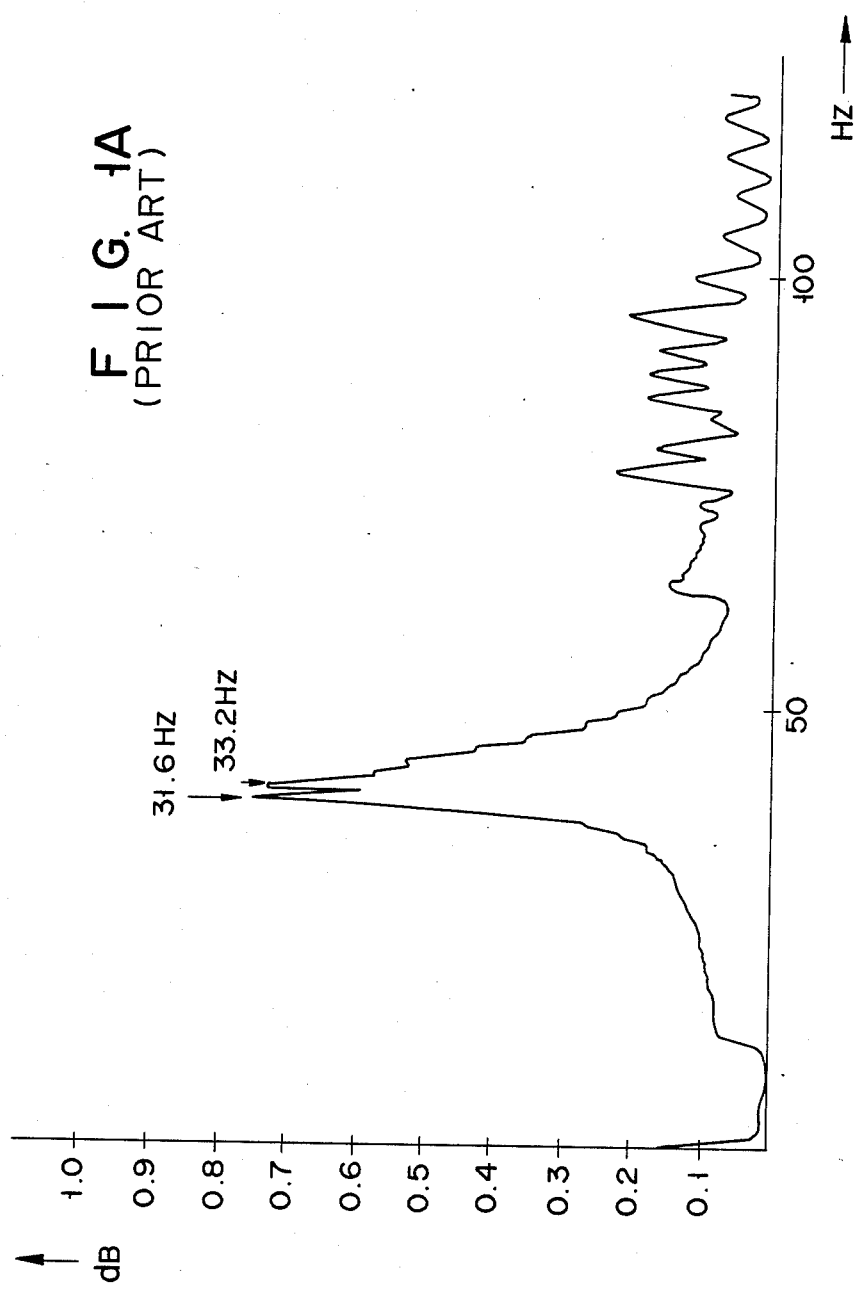
Figure 1B:
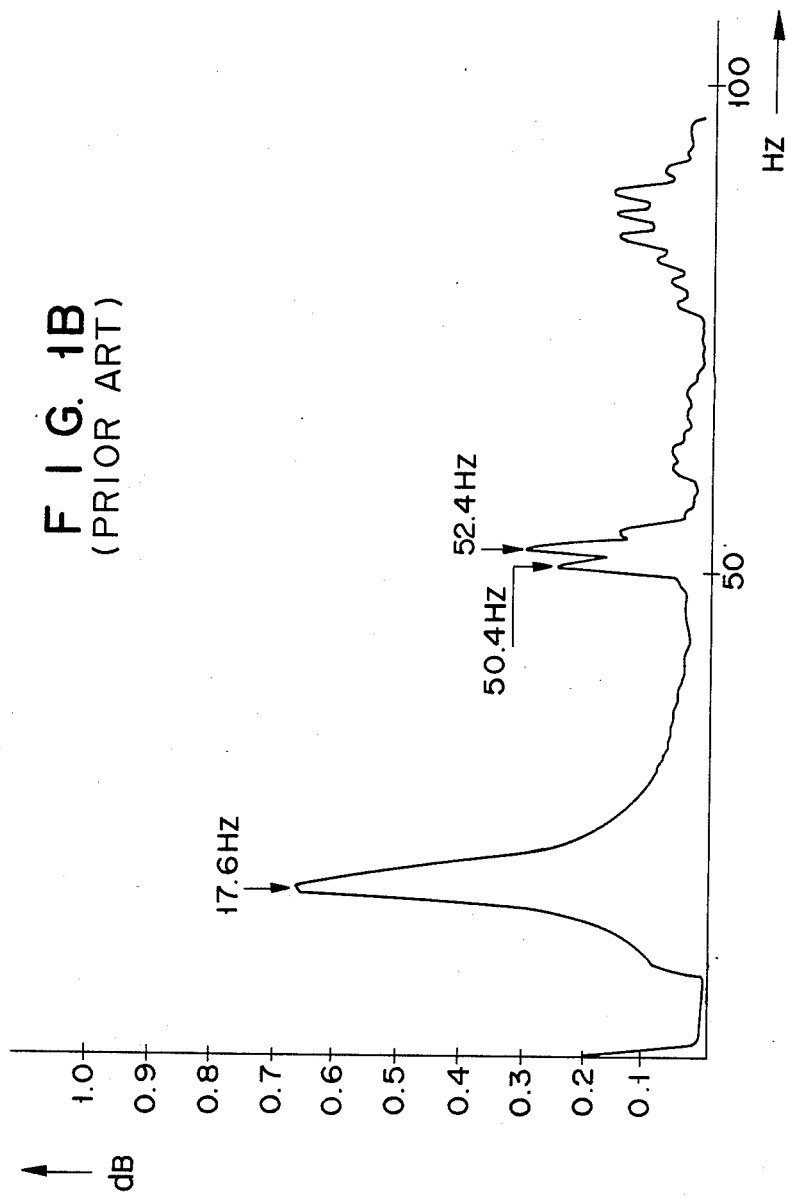
Figure 2:
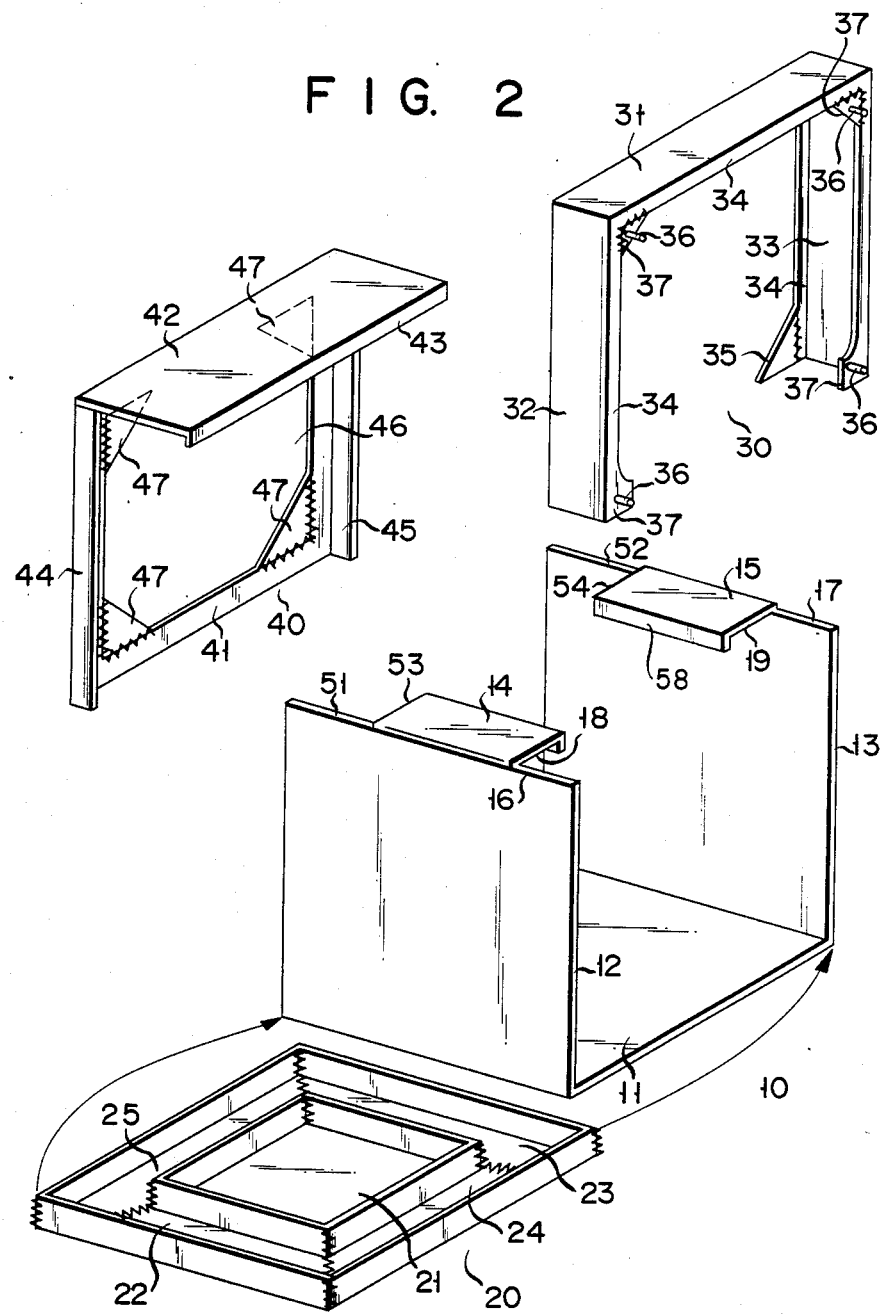
FIG. 2 is an exploded perspective view showing an embodiment of the display monitor chassis according to the invention.
Figure 3:
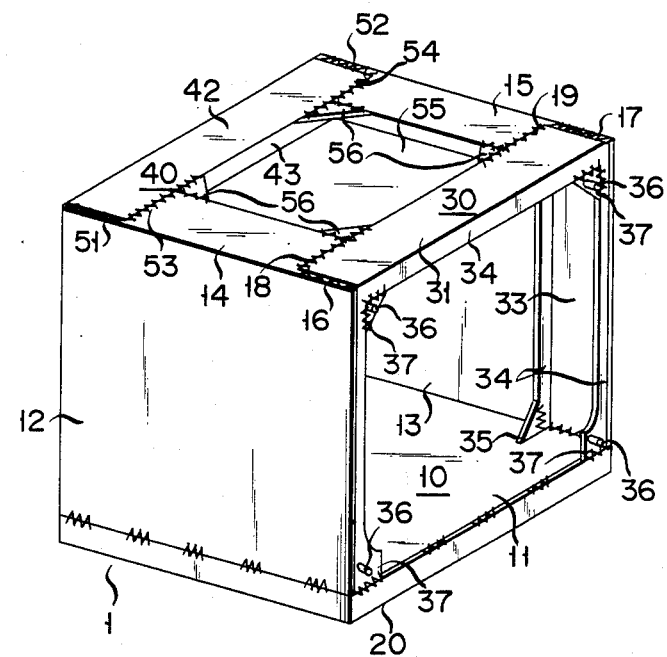
FIG. 3 is a perspective view showing the display monitor chassis shown in FIG. 2 in the assembled state.
Figure 4A:
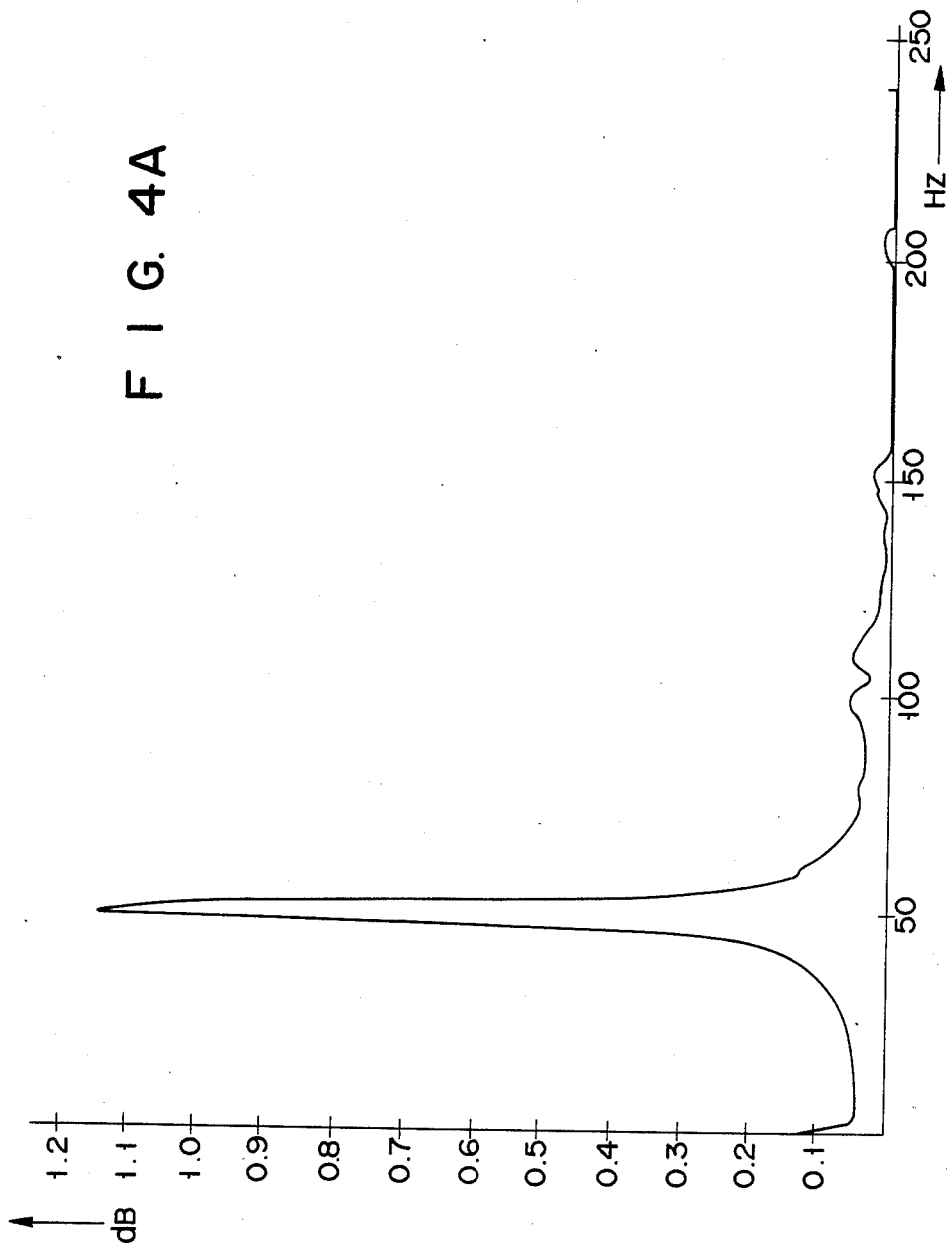

Now, an embodiment of the display monitor chassis according to the invention will be described with reference to FIG. 2. The display monitor chassis has a high natural vibration frequency not so as to resonate with a low-frequency vibration such as those of an earthquake so that it can eliminate damage to components which are mounted in the chassis. The display monitor chassis comprises main frame 10, bottom reinforcement member 20, cathode-ray tube (CRT) support frame 30 and rear panel member 40. Main frame 10 has rectangular bottom plate 11 and side panels 12 and 13 extending upwardly from left and right ends of bottom plate 11. Main frame 10 further has rectangular top plate parts 14 and 15 extending inwardly and horizontally from a central portion of the upper end of each of side panels 12 and 13. Each of top plate parts 14 and 15 has reinforcement portion 58 extending downwardly from the opposite side to the side connected to the side panel. Member 20 is made of two pair of steel members 22 and 23, and 24 and 25, each pair of steel member having the same size and shape. Each steel member consists of a trapezoidal plate, and rectangular plates extending upwardly and substantially parallel to one another from the parallel sides of each trapezoidal plate. Each rectangular plate has the same lengthwise dimension as the corresponding shorter and longer parallel sides of the trapezoidal plate from which it extends. The four steel members 22, 23, 24 and 25 are connected at respective adjacent non-parallel ends of the trapezoidal plates and at adjacent ends of each upwardly extending rectangular plate to form a rectangle having an opening 21 therein. Rectangular bottom reinforcement member 20 has the same shape as bottom plate 11 of main frame 10. The top of bottom reinforcement member 20 is secured by, for instance, welding to the corresponding portions of the outer surface of bottom plate 11 of main frame 10. The four sides of bottom plate 11 are thus reinforced. CRT support frame 30 has rectangular top plate part 31 and rectangular side frames 32 and 33. Frames 32 and 33 extend downwardly from opposite shorter ends of top plate part 31 with their shorter sides connected to top plate part 31. Top plate 31 and side frames 32 and 33 each have reinforcement portions 34 extending inwardly from the front and rear longer edges. The ends of reinforcement portions 34 corresponding to the shorter ends of top plate part 31 are cut slantwise, at about 45°. The mating cut ends of portions 34 are joined together, by welding, for instance. Corner reinforcement pieces 35 are joined, for instance by welding, to the four ends of rear reinforcement portions 34 of side frames 32 and 33 of CRT support frame 30. Further, corner reinforcement pieces with CRT mounting screws 36 secured to them are joined, by welding for instance, to the four ends of front reinforcement portions 34 of side frames 32 and 33 of CRT support frame 30. CRT support frame 30 is secured to main frame 10 with the upper ends of the outer surface of side frames 32 and 33 joined, by welding for instance, to the front portions adjacent to upper ends 16 and 17 on the inner surface of side panels 12 and 13 thereof. The lower ends of side frames 32 and 33 are joined, by welding for instance, to the front portions adjacent to the opposite shorter ends on the inner surface of bottom plate 11 thereof. The opposite end portions of the rear longer side of top plate part 31 are joined, by welding for instance, to the front free ends of top plate parts 14 and 15 of side panels 12 and 13. Rear panel member 40 is substantially L-shaped and has vertical rectangular rear panel 41 and horizontal rectangular top plate part 42. Top plate part 42 is connected to rear panel 41 at the rear longer side. Horizontal top plate part 42 has reinforcement portion 43 extending downwardly from the other front longer side. Rear panel 41 has reinforcement portions 44 and 45 extending inwardly from the opposite vertical sides and flush with the opposite free shorter ends of top plate part 42. Rear panel 41 has central rectangular opening 46 which permits adjustment and assembly of components mounted in the display monitor chassis from the back thereof. Corner reinforcement pieces 47 are joined by welding to the corners of opening 46. Rear panel member 40 is secured to main frame 10 with the opposite free shorter ends of top plate part 42 joined, by welding for instance, to the rear portions adjacent to upper ends 51 and 52 on the inner surface of side panels 12 and 13 thereof. The opposite end portions of the front longer side of top plate part 42 are joined, by welding for instance, to the rear free sides 53 and 54 of top plate part 14 and 15. The lower end of rear panel 41 is joined, by welding for instance, to the rear longer side on the inner surface of bottom plate 11. The lower ends of reinforcement portions 44 and 45 are joined, by welding for instance, to the rear portions of the opposite shorter ends on the inner surface of bottom plate 11. Alternatively, rear panel member 40 can be mounted by bolts or the like to main frame 10. Opening 46 can be omitted. Rear panel member 40, CRT support frame 30 and main frame 10 are made of steel plates, like bottom reinforcement member 20. They can be made of other materials, e.g., aluminum plates. Bottom reinforcement member 20, CRT support frame 30 and rear panel member 40 secured to main frame 10 in the manner as described above form a chassis 1 for accommodating a display monitor, having rectangular opening 55 formed at the top of the chassis as shown in FIG. 3. In this embodiment, corner reinforcement pieces 56 are welded for further reinforcement to the corners of the opening 55. The reinforcement with these corner reinforcement pieces, however, can be omitted. In FIGS. 2 and 3, welded sections are shown by sawtooth-like lines. The display monitor chassis of this embodiment can have a high natural vibration frequency of about 50 Hz. This can be understood from FIG. 4A, which shows the vibration response curve in the depth direction, and from FIG. 4B, which shows the vibration response curve in the width direction. Obviously, the rigidity is increased. The display monitor chassis does not undergo resonation even when it is subjected to a low-frequency vibrations such as an earthquake. It is thus possible to prevent the components mounted on the chassis from being vibrated independently, increasing vibratory forces, or colliding with one another. Further, the display monitor chassis has no problem with respect to vertical vibrations, as shown in FIG. 4C.

Figure 5:
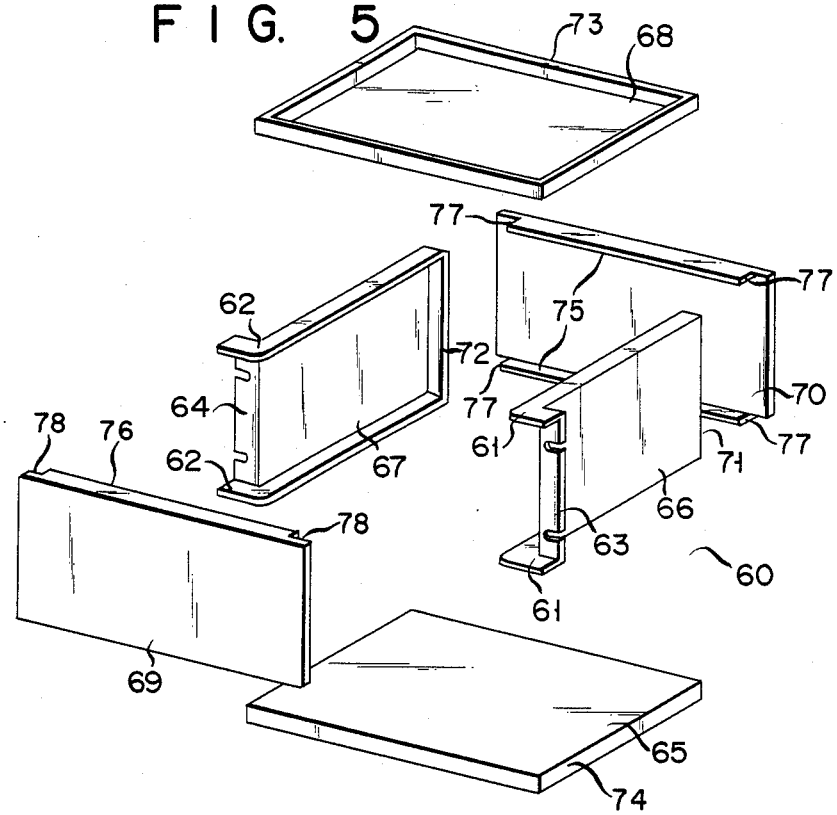
FIG. 5 is an exploded perspective view showing an embodiment of a chassis for accommodating power source units and/or control units according to the invention.
Figure 6:
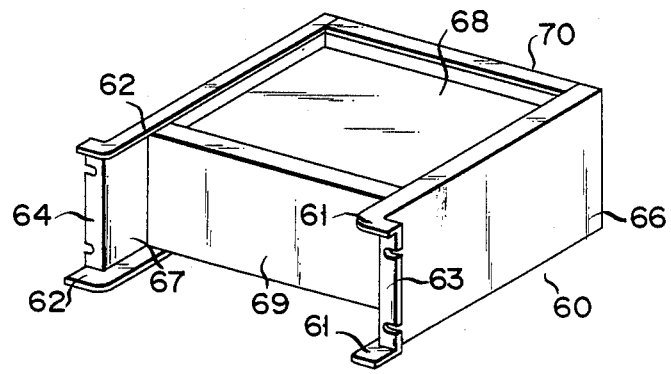
FIG. 6 is a perspective view showing the chassis shown in FIG. 5 in the assembled state.

Now, a chassis for accommodating power supply units and/or control units will be described with reference to FIG. 5. This chassis 60 comprises right side panel 66, left side panel 67, top panel 68, bottom panel 65, front panel 69 and rear panel 70. Rectangular side panels 66 and 67 have outwardly bent front end portions 63 and 64 which serve as mounts for a different chassis. Side panels 66 and 67 also have inwardly bent rectangular rear end portions 71 and 72 serving as reinforcement portions, inwardly bent upper and lower flanges 61 and 62 serving as reinforcement portions. Rectangular top and bottom panels 68 and 65 have outwardly bent rectangular reinforcement portions 73 and 74 provided along all the sides. Rectangular front and rear panels 69 and 70 have the inwardly bent rectangular upper and lower edge portions serving as reinforcement portions 75 and 76. These reinforcement portions have the notches 77 and 78 adjacent to the opposite ends. The top ends of the left and right reinforcement portions of top panel 68 contact the lower surface of upper flanges 61 and 62 of left and right side panels 66 and 67 respectively. The opposite end portions of the outer surfaces the rear reinforcement portion of top panel 68 contact the upper portions of the inner surfaces of rear reinforcement portions 71 and 72 of side panels 66 and 67. The lower ends of the left and right reinforcement portions of bottom panel 65 contact the upper surface of lower flanges 61 and 62 of left and right side panels 66 and 67. The opposite end portions of the outer surfaces of the rear reinforcement portion of bottom panel 65 contact the upper portions of the inner surface of rear reinforcement portions 71 and 72 of side panels 66 and 67. Further, the upper end of the rear reinforcement portion of top panel 68 and the lower end of the rear reinforcement portion of bottom panel 65 contact the inner surfaces of the upper and lower reinforcement portions of rear panel 70, respectively. Further, the opposite shorter ends of rear panel 70 contact the outer surfaces of reinforcement portions 71 and 72 of side panels 66 and 67. Front panel 69 is assembled such that upper end of front reinforcement portion of top panel 68 and the lower end of the front reinforcement portion of bottom panel 65 contact the inner surfaces of the upper and lower reinforcement portions of front panel 69, respectively, and the opposite shorter ends of front panel 69 are in contact with the inner surfaces of side panels 66 and 67.

Figure 7:
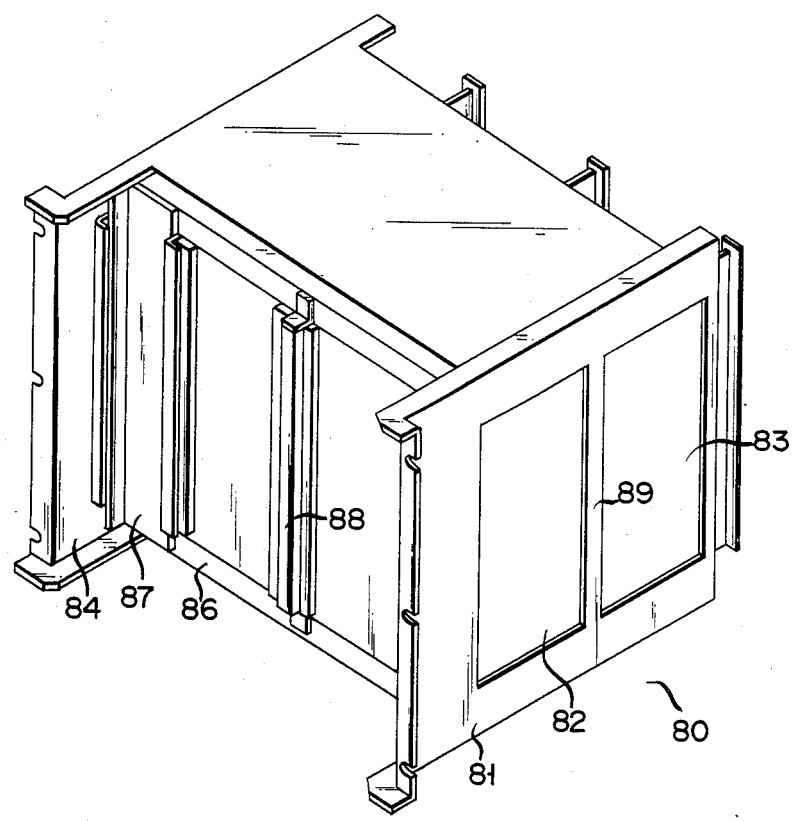
FIG. 7 is a modification of the chassis shown in FIG. 5.
Figure 8:
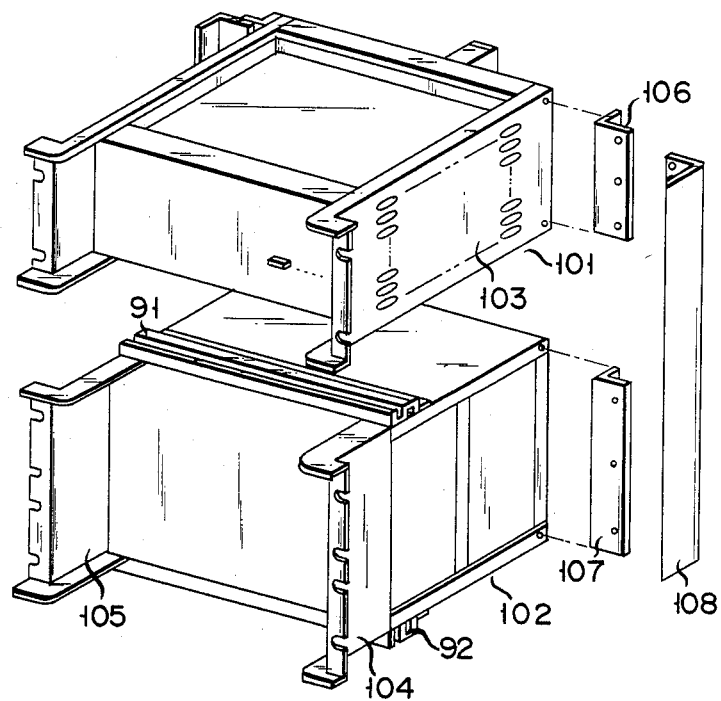
FIG. 8 is another modification of the chassis shown in FIG. 5.

FIGS. 7 and 8 show further chassis 80, 102 and 103, these chassis being basically the same in structure as chassis 60 described above. Chassis 80 shown in FIG. 7 has front panel 86 having a central rectangular opening. Reinforcement piece 88 is secured to the central portion of front panel 86. If necessary, reinforcement pieces 87 can be provided on left and right end portions of front panel 86 for joining the front panel to side panels 81 and 84. Side panels 81 and 84 have openings 82 and 83 for the purpose of cooling, for instance. Partitioning portion 89 can be provided between two openings 82 and 83.

In chassis 102 shown in FIG. 8, reinforcement members 91 and 92 are provided on the top and bottom panels. Side panels 104 and 105 are coupled by these reinforcement members 91 and 92. When the chassis is subjected to vibrations such as an earthquake, side panels 104 and 105 are vibrated in the same direction and with the same amplitude. Thus, unlike the prior art chassis where the components are vibrated independently, the chassis can prevent damage to the mounted components. This can be obtained by only one reinforcement member, 91 or 92, provided only on the top or bottom panel.

Where a plurality of chassis 101 and 102 are used to accommodate power source units and/or a control units, they can be made as one body by providing coupling members 106 and 107 on the both rear side ends of these chassis 101 and 102, and coupling together these coupling members 106 and 107 using other coupling member 108.

Figure 9:
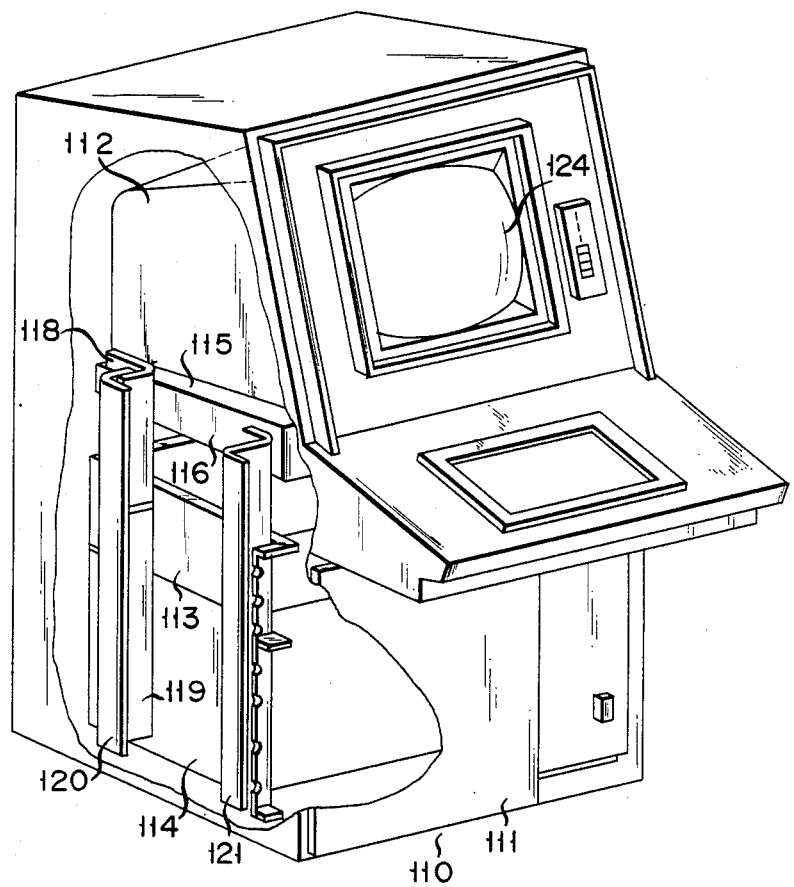
FIG. 9 is a perspective view showing an embodiment of a CRT apparatus chassis for accommodating a display monitor chassis and power source units and/or control units chassis according to the invention.

A CRT apparatus chassis 111 of a CRT apparatus 110 according to the invention, which includes chassis 112 for accommodating a display monitor and chassis 113 and 114 for accommodating power source units and/or control units, will now be described with reference to FIG. 9. In this instance, display monitor chassis 112 has substantially the same structure as the display monitor chassis shown in FIG. 3, and has also a base 116 having an inclined top to provide an inclination of the screen of a CRT 124. Base 116 is made of a steel plate and has the same shape as the bottom of bottom reinforcement member 115. Base 116 consist of a rectangular bottom, rectangular front and rear walls extending upwardly from the front and rear sides of the bottom, and the left and right trapezoidal walls extending upwardly from the left and right sides of the bottom. The front wall is higher than the rear wall, and the upper sides of both trapezoidal walls are upwardly toward the front of base 116. Bottom of base 116 is reinforced with a lattice-like reinforcement member, and top of base 116 is secured to the outer surface of bottom reinforcement member 115. Chassis 113 and 114 have substantially the same structure as chassis 60 shown in FIG. 5. Chassis 112 with the base 116 and the chassis 113 are made as one body by coupling members 118 having an L-shaped sectional profile at a rear portion of the opposite sides of base 116 and chassis 113. Further, the chassis 113 and the chassis 114 therebelow are made as one body by coupling members 119 having an L-shaped sectional profile at the opposite sides of a rear portion of two chassis 113 and 114. Further, coupling members 120, having an L-shaped sectional profile, secured to the chassis 111 are secured to the coupling members 118 and 119. In this way, chassis 112, 113 and 114 are made as one body with CRT apparatus chassis 111. Further coupling members 121 having a crank-like sectional profile, are provided on CRT apparatus chassis 111 and make chassis 112, 113 and 114 as one body with CRT apparatus chassis 111 to further improve the quake-proof property. Thus, when low frequency vibrations such as those of an earthquake is applied to CRT apparatus chassis 111, CRT apparatus chassis 111, display monitor chassis 112 and chassis 113 and 114 for accommodating power source units and control units will not be vibrated independently or increase the vibratory forces, but they are vibrated in the same direction. Thus, excellent quake-proof property can be ensured.

What is claimed is:

1. A quake-proof chassis for accommodating a display monitor comprising:
   a main frame having a front portion and a rear portion and a rectangular bottom plate having an inner and outer surface, two rectangular side panels each having an outer and inner surface and a predetermined length equal to each other extending upward and vertically from opposite sides of said bottom plate, and two first rectangular top plate parts having the same selected dimensions and extending inward and horizontally from the distal ends of said side panels;
   a cathode-ray tube support frame having a second rectangular top plate part having a front and rear side and two rectangular side frames each having a front and rear side and an outer surface and an equal predetermined length extending downward and vertically from left and right sides of said second top plate part, and a first reinforcement portion extending downward from the front side of said second top plate part and inward from said side frames;
   a rear panel member having a third rectangular top plate part having a front and rear side and a rectangular rear panel extending downward and vertically from said rear side of said third top plate part; and
   a bottom reinforcement member having length and width dimensions equivalent to said bottom plate;
   wherein, said side frames of said cathode-ray tube support frame and said rectangular rear panel have a vertical side length approximately equal to said predetermined length of said side panels of said main frame, and the length of said front side of said second top plate part and of said third top plate part are approximately equal to the length of said bottom plate of said main frame, and said cathode-ray tube support frame is secured at said front portion of said main frame such that said outer surfaces of said side frames contact said inner surfaces of said side panels of said main frame, resulting in said second top plate part and said bottom plate being approximately parallel, and said side panels, said bottom plate, and said second top plate part forming at said front portion of said main frame a first opening to mount the display monitor therein, said rear panel member being secured to said rear portion of said main frame such that opposite end sides of said rear panel member are in contact with said inner surface of said side panels of said main frame, resulting in said third top plate part and said bottom plate being parallel, and said bottom reinforcement member being secured at said outer surface of said bottom plate.

2. The quake-proof chassis of claim 1, wherein said first top plate parts further include second reinforcement portions each extending downward from the distal ends of said first top plate parts, said first top plate parts having a length selected to be less than the length of said side panels and being positioned on said side panels a selected distance from said front portion of said main frame, said selected distance corresponding to the width of said second rectangular top plate part of said cathode-ray tube support frame, and said rear side of said second top plate part being secured to said first top plate parts when said cathode-ray tube support frame is secured to said front portion of said main frame.

3. The quake-proof chassis of claim 2, wherein said cathode-ray tube support frame further includes a third reinforcement portion, first reinforcement pieces, and second reinforcement pieces, said third reinforcement portion extending downward and inward respectively from the rear side of said second top plate part and from said side frames of said cathode-ray tube support frame, said first reinforcement pieces being joined to said first reinforcement portion with cathode-ray tube mounting screws at the upper and lower ends of said side frames, said second reinforcement pieces being joined to said third reinforcement portion at the upper and lower ends of said side frames, and said cathode-ray tube support frame being secured to said main frame with said front side of said side frames flush with said front portion of said main frame on said inner surfaces of said side panels with the lower ends of said side frames joined to the front portion of said main frame opposite left and right ends of said bottom plate on said inner surface thereof.

4. The quake-proof chassis of claim 2, wherein said first top plate parts extend horizontally from the distal ends of said side panels apart from the rear sides of said side panels by a distance corresponding tot he width of said third top plate part, and said rear panel of said rear panel member further includes fourth rectangular reinforcement portions extending inward from opposite vertical sides of said rear panel and said third top plate part further includes a fifth reinforcement portion extending downward from the distal end thereof, and said rear panel member being secured to said main frame with the distal ends of said third top plate part being joined to said rear portion of said main frame adjacent the upper sides on said inner surfaces of said side panels, and opposite end portions of the front side of said third top plate part being joined to the rear sides of said first top plate parts, and the lower side of said rear panel being joined at the rear side thereof on said inner surface of said bottom plate, and the lower sides of said fourth reinforcement portions being joined to the rear portion of said main frame at the opposite left and right sides on the inner surface of said bottom plate.

5. The quake-proof chassis of claim 4, wherein said rear panel of said rear panel member has a first central opening therein, and third triangular corner reinforcement pieces being joined at the corners of the first opening.

6. The quake-proof chassis of claim 2, wherein said bottom reinforcement member comprises two pairs of plates, each member of each pair having equivalent dimensions, each of said plates having a trapezoidal bottom portion with rectangular side portions extending upward from each parallel side of said trapezoidal portion, said plates being configured to mate at adjacent non-parallel ends of said trapezoidal portion and at adjacent ends of said upwardly extending rectangular portions to form a rectangle having an opening therein, each of said upwardly extending rectangular side portions terminating in a plane.

7. The quake-proof chassis of claim 1, wherein said cathode-ray tube includes a viewing screen, and further including:
a base for supporting said bottom reinforcement member such that said screen of said cathode-ray tube is inclined upwardly, and said base comprises a rectangular bottom, and rectangular front and rear walls extending upward from the front and rear sides of said rectangular bottom, and left and right trapezoidal walls extending upward from the left and right sides of said rectangular bottom, said front wall being taller than said rear wall, and the upper sides of both trapezoidal walls being inclined upward toward the front of said base, and said base being secured to said bottom reinforcement member.

8. A quake-proof chassis for accommodating power source units and/or control units, comprising:
left and right side panels having rectangular side plates, first reinforcement portions extending outward from the front end sides of said side plates and serving as mounting portions for a separate chassis, second reinforcement portions extending inward from the rear sides of said side plates, third upper and lower reinforcement portions extending inward from the upper and lower sides of said side plates;
a bottom panel having a rectangular bottom plate and fourth reinforcement portions extending downward from the sides of said bottom plate, said bottom panel being configured such that the left and right lower sides of the fourth reinforcement portions contact the inner surfaces of the lower portion of said third reinforcement portions and the opposite end portions of the outer surface of the rear portion of said fourth reinforcement portions contact the inner lower surfaces of said second reinforcement portions when said chassis is operably assembled;
a top panel having a rectangular top plate and fifth reinforcement portions extending upward from the sides of said top plate, said top panel being configured such that the upper sides of left and right portions of said fifth reinforcement portions contact the inner surfaces of the upper portions of said third reinforcement portions and the opposite end portions of the outer surface of the rear portion of said fifth reinforcement portions contact the inner upper surfaces of said second reinforcement portions when said chassis is operably assembled;
a rear panel having a rectangular rear plate and sixth reinforcement portions extending inward from the upper and lower sides of said rear plate, said sixth reinforcement portions having notches at opposite end portions corresponding to the upper side length of said second reinforcement portions, said rear panel being configured such that opposite left and right end portions of said rear plate contact the outer surfaces of said second reinforcement portions, and the upper side of the rear portion of said fifth reinforcement portions contact the inner surface of the upper portion of said sixth reinforcement portions, and the lower side of the rear portion of said fourth reinforcement portions contact the inner surface of the lower portion of said sixth reinforcement portions when operably assembled; and a front panel having a rectangular front plate and seventh reinforcement portions with notches at the opposite end portions extending inward at upper and lower sides of said front plate, said front panel being configured such that the upper side of the front portion of said fifth reinforcement portions and the lower side of the front portion of said fourth reinforcement portions contact the inner surfaces of the upper and lower portions of said seventh reinforcement portions, respectively, and the left and right ends of the front plate are in contact with the inner surfaces of said left and right side panels.

9. The quake-proof chassis of claim 8, wherein said side panels have at least one partitioning portion extending between said openings.

10. The quake-proof chassis of claim 8, wherein said front panel has a central opening and further includes a first reinforcement member extending across the central portion of said central opening.

11. The quake-proof chassis of claim 8, wherein said front panel further includes a second reinforcement member provided on the portion adjacent to the left and right end portions of said front panel, for joining said front panel to said side panels.

12. The quake-proof chassis of claim 8, which further comprises at leasat one reinforcement member for making said side panels as one body.

13. The quake-proof chassis of claim 8, which further comprises coupling means provided on a rear side portion of said chassis for coupling said chassis to another chassis.

14. The quake-proof chassis of claim 13, wherein said coupling means comprises L-shaped members.

15. A quake-proof chassis for accommodating an electronic apparatus with a display monitor, comprising:

a first chassis accommodating said display monitor, comprising:

a main frame having a first rectangular bottom plate, first two rectangular side panels having the same size and extending upward and vertically from the left and right sides of said first bottom plate, and first two rectangular top plate parts having the same size and extending inward and horizontally from upper sides of said first side panels;

a cathode-ray tube support frame having a second rectangular top plate part, two rectangular side frames having the same size and extending downward and vertically from the left and right sides of said second top plate part, and first reinforcement portion extending inward and downward from the front sides of said second top plate part and said side frames;

a rear panel member having a third rectangular top plate part and a first rectangular rear panel extending downward and vertically from a rear side of said third top plate part;

a bottom reinforcement member having the same length and width dimensions as said bottom plate;

wherein the vertical side lengths of said side frames of said cathode-ray support frame and said first rear panel member are approximately equal to that of said first side panels of said main frame, and the front side lengths of said second top plate part and said third top plate part are approximately equal to that of said first rectangular bottom plate of said main frame, and said cathode-ray tube support frame is secured to said main frame at the front portion such that outer surfaces of said side frames are in contact with the inner surfaces of said first side panels with said second top plate part and said first bottom plate being approximately parallel, and said first side panels, said first bottom plate and said second top plate part form at a front plane of said first side panels a first opening to mount the display monitor therein, and said rear panel member is secured to said main frame at the rear portion thereof such that the left and right sides of said rear panel member contact the inner surfaces of said first side panels resulting in said third top plate part and said first bottom plate being parallel, and said bottom reinforcement member being secured to said first bottom plate at the outer surface of said first bottom plate;

at least one second chassis for accommodating power source units and/or control units, comprising:

second left and right side panels having rectangular side plates having second reinforcement portions extending outward at the front end portions of said sides plates and serving as mounting portions, and third reinforcement portions extending inward from the rear sides of said side plates, and fourth upper and lower reinforcement portions extending inward from the upper and lower sides of said side plates;

a bottom panel having a second rectangular bottom plate and fifth reinforcement portions extending downward from the sides of said second bottom plate, said bottom panel being configured such that the left and right lower sides of the fifth reinforcement portions contact the inner surfaces of the lower portion of said fourth reinforcement portions, and opposite end portions of the outer surface of the rear portion of said fifth reinforcement portions contact the inner lower surfaces of said third reinforcement portions;

a top panel having a rectangular top plate and sixth reinforcement portions extending upward from the sides of the top plate, said top panel being configured such that the upper sides of the left and right portions of said sixth reinforcement portions contact the inner surfaces of the upper portions of said fourth reinforcement portions and the opposite end portions of the outer surface of the rear portion of said sixth reinforcement portions contact the inner upper surfaces of said third reinforcement portions;

a second rear panel having a rectangular rear plate and seventh reinforcement portions extending inward from the upper and lower sides of the rear plate, said seventh reinforcement portion having notches at the opposite end portions, said second rear panel being configured such that opposite left and right end portions of the rear plate are in contact with the outer surfaces of said third reinforcement portions, and the upper side of the rear portion of said sixth reinforcement portions contacts the inner surface of the upper protion of said seventh reinforcement portions, and the lower side of the rear portion of said fifth reinforcement portions contacts the inner surface of the lower portion of said seventh reinforcement portions;

a front panel having a rectangular front plate and eighth reinforcement portions with notches at the opposite end portions extending inward from the upper and lower sides of the front plate, said front panel being configured such that the upper side of the front portion of said sixth reinforcement portions and the lower side of the front portion of said fifth reinforcement portions contact the inner surfaces of the upper and lower portions of said eighth reinforcement portions, respectively, and the left and right ends of the front plate contact the inner surfaces of said second side panels;

a first fastening means for fastening said first chassis to said second chassis;

a third chassis for accommodating said first and second chassis; and a second fastening means for fastening said first fastening means to said third chassis.

16. The quake-proof chassis of claim 15, wherein said second fastening means comprises coupling members having an L-shaped sectional profile secured to said first fastening means in a crank-like fashion to couple said first fastening means to said third chassis.

17. The quake-proof chassis of claim 15, wherein said first and second fastening means comprise a single crank-like fastening means.

18. The quake-proof chassis of claim 15, wherein said first fastening means comprises coupling members having an L-shaped sectional profile provided on the rear side portions of said first and second chassis to fasten said first and second chassis to one another.

19. The quake-proof chassis of claim 15, wherein said display monitor has a screen and said first chassis further includes a base for supporting said bottom reinforcement member such that said screen of said display monitor is inclined upward, wherein said base comprises a rectangular bottom, rectangular front and rear walls extending upward from the front and rear sides of said rectangular bottom, and left and right trapezoidal walls exending upard from the left and right sides of said rectangular bottom, said front wall being taller than said rear wall, and the upper sides of said trapezoidal walls being inclined upward toward the front of said base, said base being secured to said bottom reinforcement member.

20. The quake-proof chassis according to claim 15, wherein said first top plate parts further include ninth reinforcement portions extending downward from the distal ends of said first top plate parts, said first top plate parts having a length selected to be less than the length of said side panels and being positioned on said side panels a selected distance from front of said main frame, said selecteed distance corresponding to the width of said second rectangular top plate part, said first and second top plate parts being secured to each other;

said cathode ray tube support frame further includes a tenth reinforcement portion, first reinforcement pieces and second reinforcement pieces, said tenth reinforcement portion extending inward and downward from the rear sides of said second top plate part and said side frames, said first reinforcement pieces being joined to the portions of said reinforcement portion corresponding at the upper and lower ends of said side frames with cathode ray tube mounting screws, said second reinforcement pieces being joined to said tenth reinforcement portion at the upper and lower ends of said side frames, and said cathode ray tube support frame being secured to said main frame with upper ends of the outer surfaces of said side frames joined to the front portion of said main frame on the inner surface of said first side panels, and the lower ends of said side frames joined to the front portion of said main frame adjacent the opposite left and right ends on the inner surfaces of said first bottom plate, and said third top plate part being configured to be secured to said first top plate part;

said rear panel members further includes an eleventh rectangular reinforcement portion extending inward from the vertical sides of said first rear panel such that the upper sides of said eleventh reinforcement portion are parallel to the left and right sides of said third top plate part, and said third top plate part further includes a twelfth reinforcement portion extending downward from the front side thereof, and said rear panel member being secured to said main frame with the opposite left and right sides of said third top plate part being joined to the rear portions of said first side panels adjacent to the upper sides on the inner surfaces thereof, and the lower side of said first rear panel being joined to the rear side on the inner surface of said first bottom plate, and the lower sides of said eleventh reinforcement portions being joined to the rear portions of said first bottom plate at the opposite left and right sides on the inner surface thereof and said bottom reinforcement member comprises two pairs of plates, each member of each pair having the same size and shape, each of said plates having a trapezoidal bottom portion with rectangular side portions extending upward from each parallel side of said trapezoidal portion, said rectangular potions being the same length as respective parallel sides of said trapezoidal portion, said plates being configured to mate at adjacent non-parallel ends of said rectangular portions and at adjacent ends of said rectangular portions to form a rectangle having an opening therein, each of said upwardly extending rectangular side portions terminating in a plane.

* * * * *